Patented Nov. 16, 1937

2,099,151

UNITED STATES PATENT OFFICE 2,099,151

PRODUCTION OF MAGNESIUM FROM MAGNESIUM OXIDES

Adolf Vogt, Tschechnitz, near Breslau, Germany, assignor to Dr. Alexander Wacker Gesellschaft für Elektrochemische Industrie, G. m. b. H., Munich, Germany, a corporation No Drawing. Application April 3, 1936, Serial No. 72,540. In Germany May 22, 1935

8 Claims. (Cl. 75—10)

This invention relates to the production of magnesium from magnesium oxides and more particularly to the thermic reduction of magnesium oxides by substances forming oxides which are less volatile than magnesium.

The thermic reduction of magnesium oxides by means of metals such as aluminum, silicon or the like, which form less readily volatile oxides and permit magnesium to be reduced and volatilized, present various difficulties from a commercial standpoint by reason of the high temperatures involved, the extensive equipment required and the tendency of the raw materials to attack and injure the metals with which they come in contact.

An object of the present invention is to provide a process in which these and other difficulties are overcome.

Another object is to provide a practical, economical, dependable and efficient process for the above purpose.

Another object is to carry out the process at a sufficiently low temperature to permit the use of carbon or graphite in contact with the bath.

A still further object is to provide a continuous process of the above character.

These objects and others which will be apparent as the nature of the invention is disclosed, are accomplished by reacting the magnesium oxide with substances forming oxides less volatile than magnesium, at reduced pressures in a bath containing fluxes which facilitate the reaction. The melting point is maintained low by a proper selection of materials. The materials are fused preferably by the resistance method using carbon or graphite electrodes and the reaction is carried out preferably in an evacuated container.

More specifically, the magnesium oxides and a reducing agent are melted in the presence of a suitable flux at a reduced pressure to form a bath in which the reaction takes place for reducing the magnesium and causing the same to volatilize from the bath. The magnesium may be recovered by suitable condensers and is practically pure and uncontaminated by the oxides of the reaction bath since these oxides are less volatile than the magnesium.

In accordance with this invention various raw materials containing magnesium oxides such as dolomite, metallurgical slag and the like, are melted with a reducing agent capable of forming an oxide which is less readily volatile than magnesium, such for example, as aluminum, silicon, calcium and the like, or alloys thereof, in the presence of a flux consisting of oxides such as calcium oxide, or aluminum oxide or the like, or fluorides, or conventional fluxes such as fluorspar, bauxite, clay and the like. These materials are placed in a reaction vessel, preferably having a lining of inert material such as carbon or graphite, and are heated to a temperature sufficient to fuse the substances while under a reduced pressure. The reduced pressure may be obtained by placing the reaction vessel in a suitable gas-tight container to which suitable suction means is applied to reduce the pressure therein. The flux should be present in amounts sufficient to liquefy the mixture.

The heat may be applied in any convenient manner and it is especially advantageous to heat the bath by making use of its own electrical resistance. For this purpose an alternating current of suitable current strength and voltage may be passed through the bath by means for instance, of electrodes of carbon or graphite. The heat so produced by the internal resistance of the metals themselves serves to raise the temperature to the melting point. This melting point is maintained as low as possible by selecting the various substances used for the flux and the reducing agents and by maintaining the proper proportions thereof. One advantage resulting from this feature of the invention is that carbon or graphite may be used as the material for constructing the reaction vessel and/or the electrodes. The temperature at which the magnesium volatilizes and is removed from the bath is also reduced by reason of the reduced pressure in which the reaction takes place.

In this process the magnesium volatilizes and is thus removed from the bath and may be precipitated in either solid or liquid form to obtain substantially pure magnesium. The process may be made continuous by adding the substances to the bath as required to maintain substantially the original proportions between the active constituents and by removing the undesired ingredients in any desired manner. The conductivity of the bath may also be regulated by making the proper additions of the flux material such as any of the fluxes mentioned above.

As a specific example, a reaction vessel lined with carbon and having two built-in carbon electrodes fed by alternating current, is located in a gas-tight container in which a pressure of from 10 to 40 mm. is maintained.

The charge consists of:

| | Kilos |
|---|---|
| Aluminum—silicium—alloy: (41% aluminum, 37% silicium, Balance iron) | 6.5 |
| Calcium—silicium: (30% calcium, 54% silicium, Balance iron) | 4.5 |
| Oxide of calcium | 7.8 |
| Oxide of magnesium | 26 |
| Calcium fluoride | 11 |

When the mixture is heated to fusion temperature the magnesium oxide is reduced and practically pure magnesium distilled off. This practically pure magnesium is recovered and condensed in a cooled condenser.

It is obvious that various ingredients and proportions thereof may be varied within wide limits. A specific example has been given merely for purposes of illustration. The invention is not to be limited thereto but is only to be limited in accordance with the following claims when interpreted in view of the prior art.

The invention claimed is:

1. Process for reducing magnesium oxide which comprises melting the magnesium oxide in a vacuum of about 10–40 mm. of mercury with a reducing agent forming oxides less volatile than magnesium, in the presence of sufficient flux to liquefy the mixture.

2. Process for reducing magnesium oxide which comprises melting the magnesium oxide in a vacuum of about 10–40 mm. of mercury with a reducing agent forming oxides less volatile than magnesium, in the presence of sufficient flux to liquefy the mixture and at a temperature such that carbon or graphite may come in contact with the bath without being attacked thereby.

3. Process for reducing magnesium oxide which comprises melting the magnesium oxide in a vacuum of about 10–40 mm. of mercury with a reducing agent forming oxides less volatile than magnesium, in the presence of a flux which controls the conductivity of the mixture so that heat for melting is obtained by the passage of an electric current therethrough.

4. Process for reducing magnesium oxide which comprises melting the magnesium oxide in a vacuum of about 10–40 mm. of mercury with a reducing agent forming oxides less volatile than magnesium, in the presence of a flux which controls the melting point and the conductivity of the mixture so that heat for melting is obtained by the passage of an electric current therethrough.

5. Process for reducing magnesium oxide which comprises melting the magnesium oxide in a vacuum of about 10–40 mm. of mercury with a reducing agent selected from the class consisting of aluminum, calcium, silicon and their alloys, in the presence of a flux selected from the class consisting of calcium oxide, aluminum oxide, fluorspar, fluorides, bauxite and clay, in proportions to control the conductivity of the mixture so that heat for melting is obtained by the passage of an electric current therethrough.

6. Process for reducing magnesium oxide which comprises melting the magnesium oxide in a reaction vessel having a carbon lining in a vacuum of about 10–40 mm. of mercury with a reducing agent forming oxides less volatile than magnesium, in the presence of a flux which controls the melting point and conductivity of the mixture so that heat for melting is obtained by the passage of an electric current therethrough from carbon electrodes which dip in the bath.

7. Process for reducing magnesium oxide which comprises melting the magnesium oxide continuously in a vacuum of about 10–40 mm. of mercury in the presence of a reducing agent forming oxides less volatile than magnesium, and in the presence of a flux which controls the melting point and conductivity of the mixture so that heat for melting is obtained by the passage of an electric current through the bath, and continuously removing the depleted and undesired substances.

8. Process for reducing magnesium oxide which comprises melting the magnesium oxide in a vacuum of about 10–40 mm. of mercury in a pressure resisting gas-tight container, with a reducing agent forming oxides less volatile than magnesium and in the presence of a flux which controls the melting point and conductivity so that heat for melting the mixture is obtained by the passage of an electric current therethrough.

ADOLF VOGT.